United States Patent [19]

MacLaughlin

[11] Patent Number: 4,488,097

[45] Date of Patent: Dec. 11, 1984

[54] ELECTRIC MOTOR ROTATION POSITION CONTROL DEVICE

[75] Inventor: Donald N. MacLaughlin, Midland, Mich.

[73] Assignee: Cosden Technology, Inc., Dallas, Tex.

[21] Appl. No.: 487,410

[22] Filed: Apr. 21, 1983

[51] Int. Cl.³ ............................................... H02P 1/10
[52] U.S. Cl. ...................................... 318/443; 318/444
[58] Field of Search ................. 318/443, 444; 361/139, 361/160, 191, 192, 195; 200/5 R, 5 B, 5 D

[56] References Cited

U.S. PATENT DOCUMENTS

| | | | |
|---|---|---|---|
| 2,686,895 | 8/1954 | Feldhausen | 318/443 |
| 2,712,241 | 7/1955 | Stokes | 318/443 X |
| 2,773,231 | 12/1956 | Adriansen et al. | 318/443 |
| 3,107,322 | 10/1963 | King | 318/443 |
| 3,412,301 | 11/1968 | Mead et al. | 11/11 X |
| 3,800,400 | 4/1974 | Mistarz et al. | 221/211 X |
| 4,267,493 | 5/1981 | Roof | 318/444 X |

Primary Examiner—J. V. Truhe
Assistant Examiner—Bentsu Ro
Attorney, Agent, or Firm—Paul Devinsky

[57] ABSTRACT

Disclosed is a rotation control circuit for positioning a rotating member driven by a motor comprising a power supply and a motor relay which is energized by the power supply. A circuit is provided for intermittently energizing the relay. The circuit may comprise a first switch means connected to the power supply and a second switch means connecting the first switch means to the motor relay. The second switch means is normally closed and a timer is connected to the first switch means which is operable in response to a closing of the first switch means to generate a relay energizing signal after a predetermined time delay. This signal is operable, through an associated relay, to open the second switch means and thereby deenergize the motor relay after the predetermined time delay. The control circuit is also operable to energize the motor relay in the continuous mode. Finally, safety interlocks are provided in the control circuit to minimize any hazards to operating personnel.

30 Claims, 1 Drawing Figure

ELECTRIC MOTOR ROTATION POSITION CONTROL DEVICE

BACKGROUND OF THE INVENTION

1. Field of the Invention

The present invention relates to a rotation control circuit and more particularly to a circuit for facilitating the positioning or maintenance of motor driven equipment by providing a jog control.

2. Background and Prior Art

Many rotating devices, such as the automatic spinwelding device disclosed in U.S. Pat. No. 3,800,400 to Mistarz require periodic or intermittent maintenance of various spinning stations. Many rotating devices, of which the above-referenced spinwelder is an example, utilize mechanical speed control in order to control the rotational speed of various work stations. Such a speed control may consist, for example, of a constant speed motor and a variable pulley drive. In connection with such equipment, it is quite difficult during maintenance or cleaning operations to accurately position the various stations by accurately causing the machine to creep or jog.

For purposes of this specification jog will be construed to be a rotational movement of a spinning device through an increment sufficient to bring a particular station or spindle into its proper position for adjustment, maintenance, cleaning or other purpose. Such discrete rotation or jog is difficult to attain in that rotating equipment will tend to rotate at line speed as long as the motor is energized. In many instances, the operator must momentarily depress a push button or the like in order to briefly energize the motor and then wait to see where the rotating equipment will stop. If the position of the equipment is not that which is required, the operator will have to repeatedly energize the motor momentarily until the required position is attained.

In addition to being inconvenient and hard on the equipment, this operation may also be considered a safety hazard in that such maintenance type of operation is generally done wthout the usual safety shields or other internal safety features of the equipment in effect.

SUMMARY OF THE INVENTION

It is therefore an object of the invention to provide a rotation control device which can precisely position rotating equipment.

It is a further object of the present invention to provide a rotational maintenance function for rotating equipment which is operational even when various safety features or interlocks associated with the rotating equipment are inoperative.

It is a still further object of the present invention to provide a system whereby a rotating machine is automatically placed in a jog mode when it is not running.

It is a still further object of the present invention to provide a rotation control circuit which can be used in connection with any motor capable of either intermittent or continuous operation.

It is still a further object of the present invention to provide a station positioning device which includes a measured interval power supply circuit as well as various internal safety interlocks in both the intermittent and continuous modes of operation.

To achieve the foregoing as well as other objects, the present invention may comprise a rotation control circuit having the power supply and a motor relay operable to be energized by the power supply. A circuit for intermittently energizing the motor relay is provided which comprises a first switch arrangement connected to the power supply and a second switch arrangement connecting the first switching arrangement to the motor relay. The second switch arrangement may comprise a normally closed switch. A timer is provided which is connected to the first switch arrangement and which is operable, in response to the closing of the first switch arrangement, to generate a signal after a predetermined time interval whereby the second switch will be open and remain open. Thus, the motor relay will only be energized during the predetermined time interval.

Preferably, the first switch arrangement comprises two series connected switches, both of which must be closed in order to energize the motor relay. This is a safety feature which requires the operator to use both hands while operating the equipment in the intermittent or jog mode. It is also preferred that the switches be push-button operated and biased open so that they must remain depressed by the operator in order to stay closed.

Preferably, the timer circuit comprises a device such as a monostable multivibrator for setting a predetermined time interval in accordance with the rotation needed to present each successive station of the associated equipment. Preferably, the timer circuit is connected to a first switch relay and the second switch arrangement is responsive to the first switch relay to open the circuit to the motor relay after the expiration of the predetermined time interval.

Advantageously, the rotation control circuit is also provided with a circuit for continuously energizing the motor relay. This circuit may comprise a starter switch connected between the first switch relay and the system power supply and a further switch, responsive to said first switch relay, connected between the starter switch and the motor relay. The further switch may advantageously be a normally open switch which is closed in response to the energization of the first switch relay.

Preferably, the starter switch is a normally opened, biased open push-button switch and the continuous energization circuit comprises a latching means for holding the control circuit "on" after the start button is pushed.

As a safety interlock feature, the continuous energization circuit will advantageously include a normally closed, biased closed stop switch connected in series with the start switch and the latching means to enable the operator to stop the continuous energization of the motor relay at will.

As an added safety interlock, a fifth switch may be provided in series with the starter switch and the latching means. The fifth switch is preferably a normally closed, relay operating switch responsive to a third relay and operable to open in response to the energization of the third relay to thereby interlock the continuous energization of the motor relay. The third relay may be connected to an open terminal of a fault detector so as to automatically energize the third relay upon occurrence of a fault to thereby interrupt continuous operation of the motor relay. The third relay may also be connected to a jog signal terminal to thereby automatically interrupt continuous operation of the motor relay upon occurrence of a jog signal.

Preferably, the entire control circuit, including the motor relay, is energized by a low voltage DC (e.g. 12 volt DC) power supply which is the same power supply used to operate the entire control system of the associated equipment.

BRIEF DESCRIPTION OF THE DRAWING

The accompanying drawing, which is incorporated in and forms a part of the specification, illustrates the presently preferred embodiment of the present invention, and together with the description, serves to explain the principles of the invention. In the drawing.

DETAILED DESCRIPTION OF THE INVENTION

Figure 1:
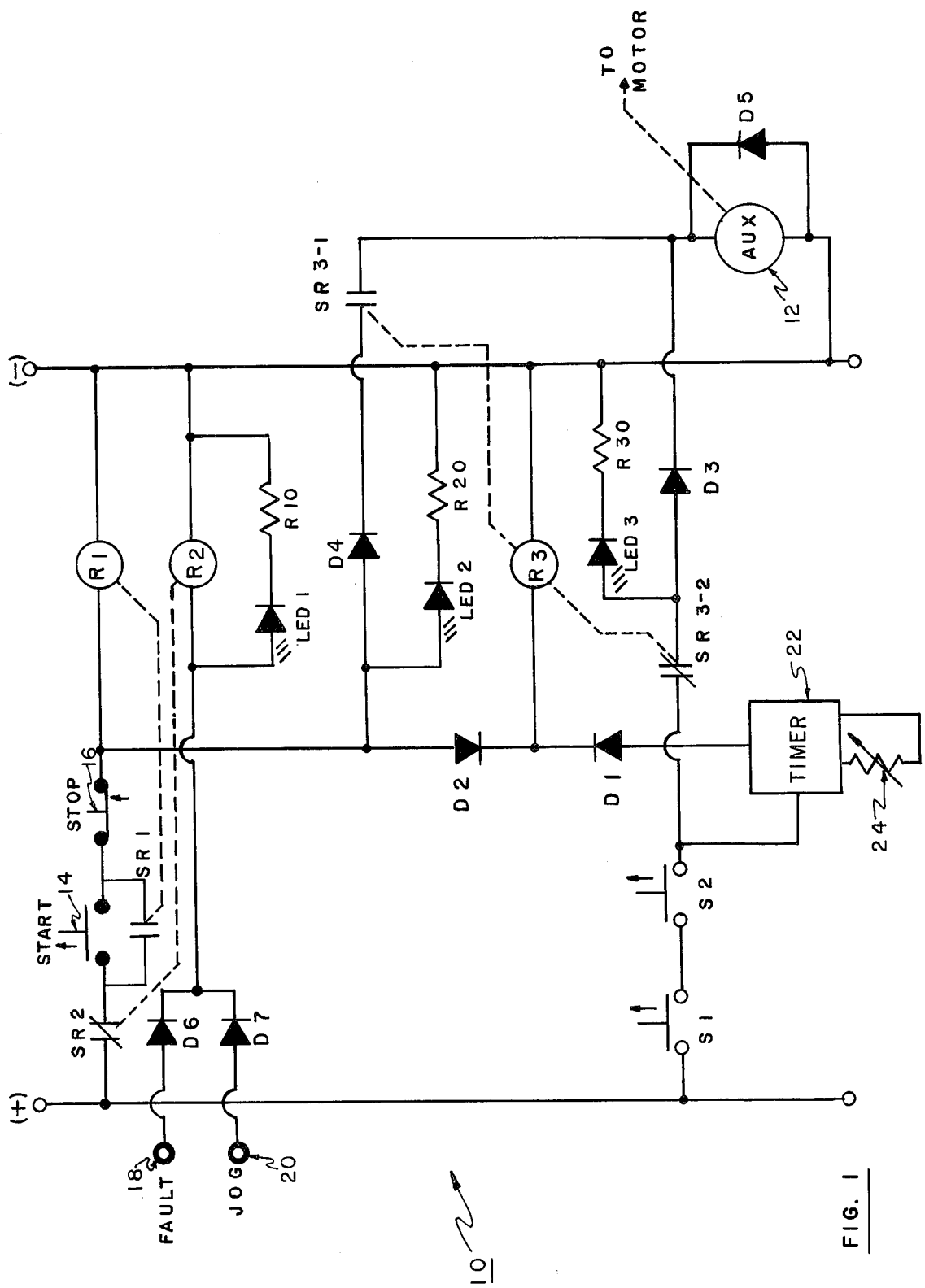
FIG. 1 is a schematic diagram of a rotation control circuit in accordance with the present invention.

Reference will now be made in detail to the present preferred embodiment of the invention, an example of which is illustrated in the accompanying drawing. A rotation control circuit 10 is provided for controlling the position of a rotating mandrel or spindle or the like which is driven by an electric motor, typically through a variable belt drive or the like as described in U.S. Pat. No. 3,800,400, the disclosure of which is hereby incorporated by reference. A heavy duty relay means is provided to energize the driving motor. The driving motor, in the case of a spinwelder, will rotate tools or position tool stations or the like as schematically indicated in the drawing. Such a relay may comprise the motor relay 12 which is interposed between the motor windings and the control circuit and which is preferably energized by the low voltage (e.g. 12 v D.C.) source $(+,-)$ which functions as a power supply for the control circuit 10. Preferably, means are provided to prevent any back EMF from the motor relay 12 from surging back into the solid state circuit 10. Such means may include suppression diode $D_5$ which is connected so as to shunt the relay 12. It should be understood that the motor relay 12 may comprise a magnetic coil of about 12 v D.C.—10 amp capacity which can be used as a relay for a 5 h.p., 220 V, 3 motor as may be used with the spinwelder of the above referenced patent.

For energizing the motor relay 12 during normal operation a continuous energizing circuit is provided. Such means may include start button 14 which is preferably in the form of a normally open, push-button type switch. A latching means is preferably provided to hold the system on after the push-button switch 14 is depressed. Such means may include a relay $R_1$ and a normally open switch $SR_1$ operated by the relay $R_1$. Relay $R_1$ is connected in series with start switch 14 and between the switch 14 and the low side of the power supply. Relay switch $SR_1$ shunts the start switch 14 and is connected, preferably through a normally closed switch $SR_2$, to the high side of the power supply. Thus, whenever switch 14 is depressed, relay $R_1$ is energized (assuming $SR_2$ and stop switch 16 are both closed) which closes $SR_1$ latching the circuit on unless or until normally closed switches $SR_2$ or 16 are opened.

As alluded to above, a means is provided for shutting down power to the relay 12 after the motor has been energized. Such a means may include normally closed, push-button stop switch 16 which, when depressed, will interrupt the power to relay $R_1$ (thereby unlatching the start switch 14) as well as power to the motor relay 12. It should be understood that in order to restart the motor after a power interruption, the start switch 14 will have to be reset.

In order for relay $R_1$ to remain energized and switch $SR_1$, it should be understood that switch $SR_2$ must remain closed. Switch $SR_2$ is provided as an automatic safety interlock and operates as follows:

If, during normal, a fault should be sensed with respect to the rotating equipment, a fault signal will be transmitted to terminal 18 and through steering diode $D_6$ to relay $R_2$. An example of a condition that may be construed as a fault is an unsecured or open safety shield whose condition may be sensed by a device such as those disclosed in copending Ser. No. 487,407 filed Apr. 21, 1983 or Ser. No. 487,379 filed Apr. 21, 1983, the disclosures of which are hereby incorporated by reference. Alternatively, a jog command may be inputted through terminal 20 and steering diode $D_7$ to relay $R_2$ whenever it is desired to change the control circuit 10 for the motor relay 12 from the continuous to the jog mode for maintenance, repair, etc. Whenever relay $R_2$ is so energized, normally closed switch $SR_2$ is opened thus interrupting power to the relay $R_1$ and direct energization of the motor relay 12. Thus, it should be apparent that whenever the control circuit is not in the continuous mode with switches $SR_2$, $SR_1$ and 16 closed, it will automatically be in the jog or intermittent operation mode.

Preferably, means are provided for indicating to the equipment operator when a fault or jog signal has been received and the relay $R_2$ energized. Such an indication means may include $LED_1$ and current limiting resistor $R_{10}$. The $LED_1$ may advantageously be positioned on an appropriately labeled master control panel.

Circuit means are provided for energizing the relay 12 in the continuous mode. Such means may include steering diode $D_4$ and normally open switch $SR_{3-1}$. Switch $SR_{3-1}$ may be operated by a relay $R_3$ is connected between the stop switch 16 and the low side of the power supply via a steering diode $D_2$. Whenever the switches $SR_2$, $SR_1$ and 16 are all closed, i.e. continuous run mode of operation, the relay $R_3$ is energized and switch $SR_{3-1}$ is closed. Therefore the motor relay 12 is energized via diode $D_4$ to operate the motor in the continuous run mode.

Means may be provided to provide the operator with an indication that the equipment is in the continuous rotation mode of operation. Such means may include $LED_2$ and current limiting resistor $R_{20}$. As with $LED_1$, $LED_2$ may be positioned on an appropriately labeled master control panel so as to be readily visible to the equipment operator.

Whenever the control circuit is in the jog mode, (i.e. relay $R_2$ energized or stop button 16 is depressed), the motor relay 12 can be energized through a measured interval power supply circuit which, in the context of spinwelding equipment or the like, will supply intermittent power to the relay 12 to provide precise positioning of various equipment stations to facilitate cleaning, maintenance, repair, etc. in a safe and convenient manner. In order to energize the relay 12 in the jog mode, an intermittent circuit closing means and power timing means are provided. Preferably, the circuit closing means may include push buttons $S_1$ and $S_2$. Since safety shield and the like may not be secured, two push buttons, appropriately spaced are advantageously used in order to require the operator to use both of his or her hands when operating the system in the jog mode. This is important from a safety standpoint since, in the jog mode, the fault detection system is not effective to prevent station rotation and the need to occupy both hands prevents the operator from putting his hands at risk during station positioning for maintenance purposes.

Whenever the switches $S_1$ and $S_2$ are depressed, a timer circuit 22 will time out a time delay TD and then go from its low to its high state. At the same time, the motor relay is energized through $S_1$, $S_2$, $SR_{3-2}$ and $D_3$ since the switch $SR_{3-2}$ is normally closed. The timer 22 may comprise a one shot or monostable multivibrator with a variable resistor 24 in its charging circuit to enable the operator to select a time delay having an interval which corresponds to the rotation required to move the device from one station to the next. The time delay should be limited to about 1–2 seconds to restrict the use of the jog mode to intermittent operation.

The timer 22 is connected to relay $R_3$ via steering diode $D_1$. After the timer 22 times out the delay TD and goes high, the relay $R_3$ will be energized in order to open normally closed the switch $SR_{3-2}$. As long as switches $S_1$ and $S_2$ remain depressed and the relay $R_3$ remains energized, the motor relay 12 will be deenergized since the switch $SR_{3-2}$ will remain open. In order to effect another jog step, the operator must reset the system by releasing the switches $S_1$ and $S_2$ thereby returning the timer output to its low state causing the relay $R_3$ to become deenergized, thereby re-closing $SR_{3-2}$. Therefore, if it is desired to rotate the station further or to a new position, the switches $S_1$ and $S_2$ must be released and depressed again, thereby re-energizing the motor coil 12 for a period corresponding to the timer delay time TD.

Preferably, an indication means may be provided for the operator to indicate when the motor is rotating in the intermittent or jog mode. Such an indicator may include $LED_3$ and current limiting resistor $R_{30}$ connected between the anode of the steering diode $D_3$ and the power supply. The $LED_3$, like the other indicators, may advantageously be positioned on a master control panel in a location readily visible to the operator.

It will be apparent to one of skill in the art that a rotational control system as described above can be used in connection with any motor or any intermittent or continuous operation and that the timer of the present invention will provide the measured interval of power to the motor relay to allow precise positioning of various stations connected with the associated rotating equipment. It is also apparent that the circuit described above will provide operator safety, both in terms of its physical operation and in terms of its automatic safety interlock operable to shut down from the continuous mode of operation upon the detection of a fault. Thus, there has been described a rotation control circuit which can advantageously be used with a spinwelder or the like which rotates at a generally constant speed. It should also be understood that the control system can be used as well any motor driven equipment that opeates in discontinuous cycles. The rotation control system of the present invention, when operating in the intermittent mode, will provide the heretofore locking precise station positioning for motor driven, rotating type of equipment by providing a measured interval of power to a motor relay coil to thereby properly position the next station of the associated equipment. The invention as described above also provides safety interlocks in that any fault signal or jog indication will interrupt continuous operation of the associated motor and automatically transfer motor control to the intermittent or jog mode. The stop button 16 and the dual, push-button switches which must be depressed for intermittent operation or further safety devices to prevent hazards to operating personnel.

The foregoing description of a preferred embodiment of the invention has been presented for purposes of illustration and description. It is not intended to be exhaustive or to limit the invention to the precise form disclosed. Obviously, many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A rotation control circuit comprising:
  a power supply;
  a motor relay operable to be energized by said power supply;
  a circuit for intermittently energizing said motor relay comprising:
  a first switch means, connected to said power supply;
  a second switch means for connecting said first switch means to said motor relay, said second switch means being normally closed;
  a timer connected to said first switch means and operable, in response to the closing of said first switch means, to generate a time delayed signal having a predetermined time delay, said time delayed signal being operable to open said second switch means thereby energizing said motor relay in response to each closing of said first switch means for a period corresponding to said predetermined time delay regardless of whether said first switch means is closed for a period of time greater than said predetermined time delay.

2. The circuit of claim 1, wherein said first switch means comprises two series connected switches, both of which must be closed to energize said motor relay.

3. The circuit of claim 1, wherein said timer further comprises means for setting said predetermined time delay, and wherein said second switch means is a relay operated switch, and said intermittant energizing circuit further comprises a first relay connected to said timer and responsive to said time delay signal to open the second switch means after said predetermined time delay.

4. The circuit of claim 1, wherein said control circuit further comprises means for suppressing any back EMF generated by said motor relay.

5. The circuit of claim 1, wherein said power supply is a low voltage DC power supply.

6. The control circuit according to claim 1 wherein said timer comprises a one-shot multivibrator.

7. The circuit of claim 2, wherein said switches are push-button, biased-open switches.

8. The circuit of claim 3 further comprising a first steering diode connected between said timer and said first relay and a second steering diode connected between said second switch means and said motor relay.

9. The circuit of claim 3 further including a circuit for continuously energizing said motor relay comprising:
  a start switch connected between said first relay and said power supply to energize said first relay and a third switch connected between said start switch and said motor relay to energize said motor relay, said third switch being a normally-open, relay operated switch operable to close in response to energization of said first relay.

10. The circuit of claim 3, wherein said timer is operable to produce a motor relay energization pulse having a duration corresponding to a predetermined rotation position of a motor associated with said motor relay.

11. The control circuit according to claim 3 wherein said timer comprises a one-shot multivibrator and said time delay setting means comprises a variable resistor of said one-shot multivibrator.

12. The circuit of claim 8 further including a first indicator means for indicating when said motor relay is intermittently energized.

13. The circuit of claim 9, wherein said start switch is a normally-open, biased open, push-button switch, said continuous energizing circuit further comprising a latching circuit for holding said control circuit on after said start switch button is pushed.

14. The circuit of claim 9, wherein said rotation control circuit is operable to automatically shift between continuous energization and intermittent energization.

15. The circuit of claim 13 further including a safety interlock comprising a normally-closed, relay-operated switch connected in series with said start switch and with said normally open shunting switch and a third relay, said normally closed series connected switch being operable to open in response to energization of said third relay to thereby interrupt continuous energization of said motor relay.

16. The circuit of claim 13 further comprising a normally-closed, biased-closed, stop switch connected in series with said start switch and with said normally open shunting switch.

17. The circuit of claim 13, wherein said latching circuit comprises a normally-open, relay-operated switch shunting said starter switch, and a second relay connected between said switch and a low side of said power supply whereby when said start switch is closed, said second relay is energized and said normally-open shunting switch is closed.

18. The circuit of claim 15, wherein said third relay is connected to an output terminal of a fault detector and is automatically energized upon the occurrence of a fault.

19. The circuit of claim 15 further comprising a second indicator means for indicating when said motor relay is continuously energized.

20. The circuit of claim 18, wherein said third relay is connected to a jog signal terminal and is automatically energized upon the occurrence of a jog signal.

21. The circuit of claim 20, wherein the rotation control circuit is operable to automatically shift to intermittent motor relay energization whenever continuous motor relay energization is interrupted.

22. The circuit of claim 20 further comprising a third indicator means for indicating when said continuous energization has been interrupted.

23. The circuit of claim 20, wherein the rotation control circuit is operable to automatically shift to intermittent motor relay energization whenever continuous motor relay energization is interrupted.

24. A rotation control circuit for controlling the position of a tool on a spinwelding device comprising:
a power supply;
a motor relay operable to be energized by said power supply;
a circuit for intermittently energizing said relay comprising a first switch means, connected to said power supply;
a second switch means for connecting said first switch means to said motor relay, said second switch means being normally closed;
a timer connected to said first switch means and operable, in response to the closing of said first switch means, to generate a time delayed signal having a predetermined time delay, said time delay signal being operable to open said second switch means thereby energizing said motor relay in response to each closing of said first switch means for a period corresponding to said predetermined time delay whereby a motor associated with said motor relay is energized to rotate the position of said tool through a predetermined rotation regardless of whether said first switch means is closed for a period of time greater than said predetermined time delay.

25. The circuit of claim 24, wherein said timer further comprises means for setting said predetermined time delay and wherein said second switch means is a relay operated switch and said intermittent energizing circuit further comprises a first relay connected to said timer and responsive to said time delay signal to open the second switch means after said predetermined time delay whereby power to said motor relay is interrupted.

26. The circuit of claim 24 further including a circuit for continuously energizing said motor relay comprising:
a start switch connected between said first relay and said power supply to energize said first relay and a third switch connected between said start switch and said motor relay to energize said motor relay, said third switch being a normally-open, relay operated switch operable to close in response to energization of said first relay, said start switch comprising a normally-open, biased open, push-button switch, and
a latching circuit for holding said control circuit on after said start switch is closed.

27. The control circuit according to claim 24 wherein said timer comprises a one-shot multivibrator.

28. The circuit of claim 25, wherein said timer is operable to produce an energization pulse corresponding to a predetermined rotation position of a motor associated with said motor relay to thereby rotate a tool of said spinwelder to a new predetermined position each time said first switch means is closed.

29. The control circuit according to claim 25 wherein said timer comprises a one-shot multivibrator and said time delay setting means comprises a variable resistor of said one-shot multivibrator.

30. The circuit of claim 26 further including a safety interlock comprising a normally-closed, relay operated switch connected in series with said start switch and with said latching circuit, and a third relay, said normally-closed series connected switch being operable to open in response to the energization of said third relay to thereby interrupt continuous energization of said motor relay, said third relay being connected to an output terminal of a fault detector to be automatically energized upon the occurrence of a fault, thereby interrupting continuous energization of said motor relay.

* * * * *